Nov. 12, 1940.  P. A. BORDEN  2,220,951
RHEOSTAT FOR ELECTRICAL MEASURING CIRCUITS
Filed Nov. 15, 1937
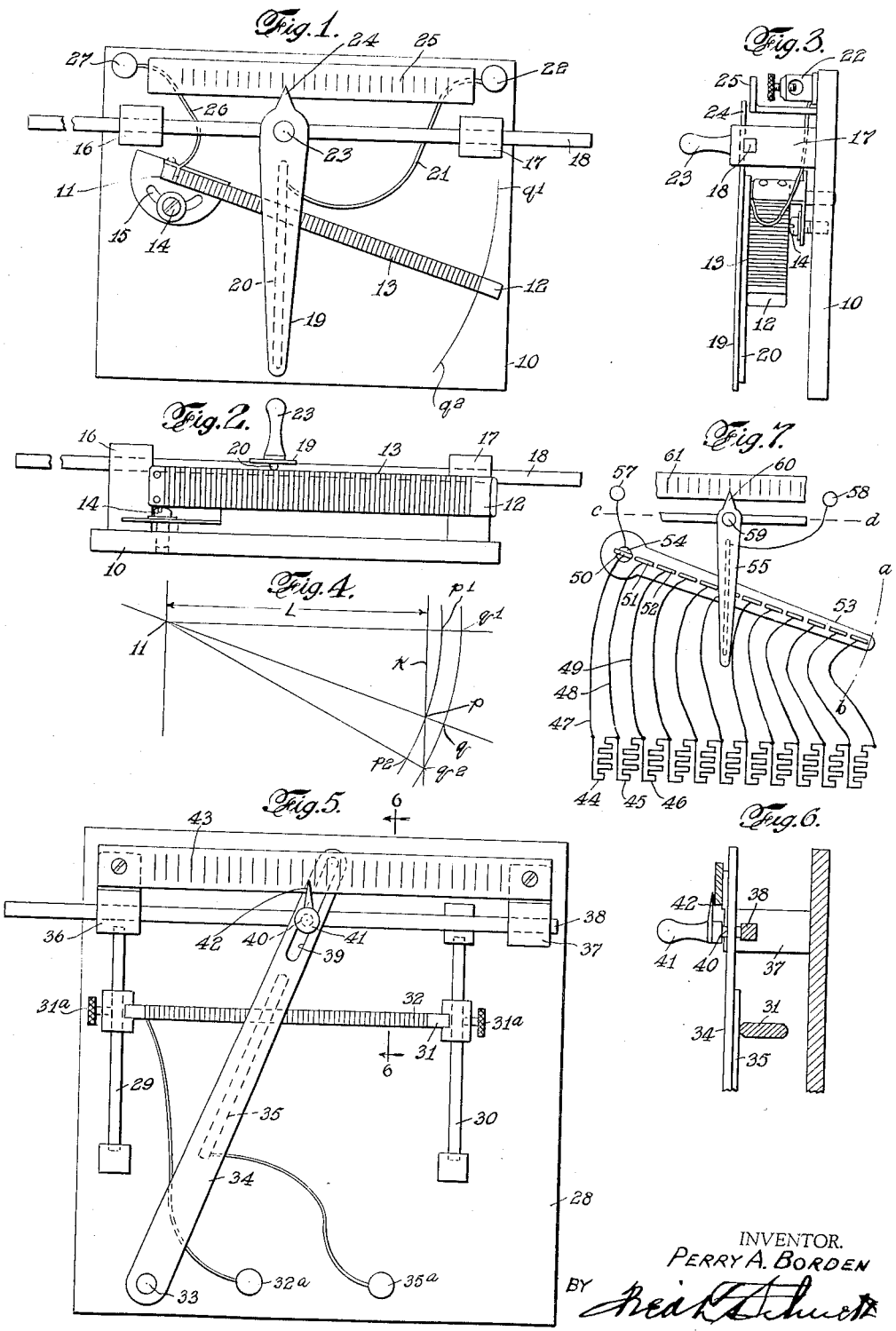
INVENTOR.
PERRY A. BORDEN
BY
ATTORNEY.

Patented Nov. 12, 1940

2,220,951

UNITED STATES PATENT OFFICE 2,220,951

RHEOSTAT FOR ELECTRICAL MEASURING CIRCUITS

Perry A. Borden, Waterbury, Conn., assignor to The Bristol Company, Waterbury, Conn., a corporation of Connecticut Application November 15, 1937, Serial No. 174,730

2 Claims. (Cl. 201—62)

This invention relates to rheostats, and more especially to a calibrated variable resistance suited for use in electrical measuring circuits. In the performance of electrical measurements or in the use of electrical methods for the performance of measurements upon other physical magnitudes, it is frequently found expedient to represent a quantity to be included in a computation by a resistor; and, if this quantity be of a variable nature, by a variable resistor or rheostat. This practice is current, not only in the laboratory, where more or less temporary and experimental combinations are made, but in a number of important engineering applications. For example, in those devices known as calculating tables, used by power transmission engineers for determining values of current flow under various conditions of short circuits and grounds in power transmission systems, it is customary to make use of calibrated resistors and rheostats to represent various units in a system, and by combinations of the same to simulate combinations of impedances in a certain arrangement of a power system. Again, in the practice of telemetering, it is sometimes expedient to provide a number of separate rheostats independently adjustable to represent in their resistance values separate sections of an electric power load or other variable of which a summation is required, and, by connecting these in series, to obtain a total resistance value representative of the required summation. Such a system is set forth and fully described in U. S. Letters Patent No. 1,260,094, issued March 19, 1918.

In the adjustment of rheostats of this type, whether it be to compensate for unavoidable variations in manufacture, or to coordinate individual units with conditions characterizing particular installations, there arises the problem of adjusting the total value of a rheostat, and at the same time maintaining the original proportionality of increments in relation to movement of the slider or contacting member coacting with elements of resistance. For instance, in a rheostat for this class of work, it may be assumed that the total required value of resistance is R, and that it is required that variations in resistance value bear a linear relationship to movements of the contacting element. In such a case the total excursion of the contactor would be required to introduce a value of R into the circuit, and a movement of $1/n$ of the total excursion would introduce a resistance value of $R/n$ into the circuit, the proportionality remaining the same throughout the whole range of the rheostat. Assuming that, owing to manufacturing conditions, the resistance element after fabrication is found to have a value of 1.05 R instead of R, it will be apparent that if the unit has been uniformly wound, each increment of $1/n$ of the total excursion of the contactor will represent a value of $1.05 R/n$ instead of the desired value of $R/n$. There thus arises the problem of correcting the total value of the rheostat for a predetermined excursion of the contact member, and at the same time obtaining a proportional correction throughout the scale.

Again, in the coordination of a number of rheostats of this nature for such purposes as electrical computation, it frequently becomes necessary to provide such a proportional adjustment throughout the whole range of the unit.

It will be apparent that, while with resistance units connected in balance circuits, such as potentiometer slide-wires, it is frequently possible to adjust the fall of potential across given increments of the slide-wire in relation to increments of motion by modifying the flow of current in the slide-wire, which may generally be effected by connecting additional resistances in series or in parallel with the basic unit, such methods of adjustment are not feasible where the slide-wire unit or equivalent is to function as a rheostat whose ohmic value is required to have a specific magnitude and to maintain a uniform proportionality in relation to different positions of the deflecting or contacting member.

It is an object of this invention to provide a rheostat whose effective resistance value may be varied by uniform increments in relation to excursions of the contacting member, and in which the value of all of said increments may be varied by a single adjustment, without disturbing the required uniform proportionality.

The nature of the invention, however, will best be understood when described in connection with the accompanying drawing, in which:

Figs. 1, 2, and 3, represent respectively a plan, front elevation, and side view of a rheostat embodying the principles of the invention.

Fig. 4 is a diagram illustrating geometric relations involved in the form of the invention shown in Figs. 1, 2, and 3.

Fig. 5 is a plan view of an alternative form of the invention.

Fig. 6 is a partial section and elevation of the same, taken along the line 6—6, Fig. 5.

Fig. 7 is a partial plan view of a further alternative form, embodying the same geometrical relations as set forth in Fig. 4.

Referring to the drawing, more particularly to the embodiment shown in Figs. 1, 2, and 3, 10 designates a base-plate upon which is pivotally mounted about an axis 11, passing through a point near one of its extremities, a straight slide-wire element 12 uniformly wound with insulated resistance wire having the insulation removed from one edge 13. This provides in a substantially linear dispostion a plurality of exposed contact points through which electrical contact may be made with individual turns or sections of the resistance winding. The said slide-wire element 12 is made angularly adjustable through a limited angle about the axis 11, and may be clamped in any adjusted position by means of a screw 14 threaded into the plate 10 and frictionally engaging an arcuate slot 15 on the slide-wire structure.

Mounted upon the plate 10 are a pair of guide blocks 16 and 17, providing a runway for a straight rod 18 disposed perpendicularly to the axis 11 and supporting an arm 19 bearing a contacting element 20. The element 20 may consist of a bar or extended wire of suitable contact material, and is disposed to have an engaging surface in the form of a straight line perpendicular to the rod 18 and to the axis 11, and adapted for sliding contact with the resistance element along the exposed surface 13. The ohmic value included between one extremity of said resistance winding and the contact element may thus be varied by sliding element 20 over the surface or edge 13 of the slide-wire element; and the contacting element 20 is connected by means of a flexible conductor 21 to a terminal 22 mounted upon, but insulated from, the base-plate 10.

Provision is made for translating the arm 19 and the contact member 20 in a direction perpendicular to the extended length of the latter by means of a manually engaged knob or handle 23; and a measure of the translated position of the contact member is obtained from the indication of a pointer 24 attached to the arm 19 and traversing a graduated scale 25 mounted upon the base-plate 10.

The resistance winding is disposed upon the structure of the slide-wire element 12 with one end of the winding lying upon the axis 11, which end is connected by means of a flexible conductor 26 to a terminal 27 mounted upon the plate 10. The relative disposition of the contacting element 20 and the slide-wire structure 12 is made such that at one end of its excursion the contacting element engages the slide-wire at a point lying on the axis 11, so that under this condition a resistance value of zero is included between the terminals 22 and 27, while its opposite extremity swings in an arc $q_1q_2$.

The action of the rheostat will best be understood by reference to Fig. 4, in which is shown the geometric relation of the essential elements.

The definite and fixed excursion of the contact member 20 is represented by the length L, the length of the portion of the wound part of the structure corresponding to the desired maximum resistance value R by the linear distance from the axis 11 to a point $p$ on the contacting surface 13 of the slide-wire, and the length of the total wound portion of the structure by the distance from the axis 11 to a point $q$ on the same surface. A straight line K, perpendicular to the line of travel of the contacting element 20, and at the end of its excursion remote from the axis 11, represents the extreme position of the line of contact between said contacting element and the slide-wire.

It will be seen that as the slide-wire structure is swung about the axis 11, the point $p$ will describe an arc $p_1p_2$, and the point $q$ an arc $q_1q_2$, which arcs will intersect the line K. With the slide-wire structure in a position having its extended length perpendicular to the line K, it will be apparent that the ohmic value of the resistance included between the left-hand extremity of the winding and the contact element 20 will be a minimum, and that with the structure in the position where the point $p$ lies on the line K, the resistance value will be equal to R, the desired maximum resistance setting of the rheostat, and that with the slide-wire in the point where the arc $q_1q_2$ intersects the line K, the maximum possible resistance will be included in the circuit. It will further be apparent that, in accordance with well known geometrical laws, the increments of resistance with movements of the contact element in a sense perpendicular to the line K will vary in direct proportion to the deflections of said member along the line L from the point of zero resistance, corresponding to the intersection of the axis 11 by the contact element. Thus, in the manufacture of a rheostat embodying this principle, it is necessary only that the slide-wire be uniformly wound to such a resistance that the length L measured along the slide-wire will represent a somewhat lower resistance value than the desired maximum setting, when, upon assembly, the slide-wire may be set at such an angle that the total excursion of the contacting member represents the desired maximum, whereupon all lesser increments of movement of the contacting member along its path will cause proportional increments of resistance to be included in the circuit.

It will further be apparent that the same adjustment permits rheostats of this class intended for use in combination with others in measuring circuits to be coordinated by adjustment to equal or predetermined values, without disturbing their linear proportionality.

In Fig. 5 is shown an alternative form of rheostat embodying the characteristics of the invention, the setting of the resistance value being in this instance effected by angular displacement of a straight-line contact member, and adjustment by translation of the slide-wire structure in a sense perpendicular to its extended length.

Upon a base-plate 28 are mounted two parallel guideways 29 and 30, between which is carried an extended slide-wire structure 31, said slide-wire structure being uniformly wound with resistance wire having one edge 32 exposed to provide a multiplicity of contact points lying in a straight line, and the structure adapted to be adjustably positioned along said guideways in a sense that the straight line formed by the contact surface 32 will always remain parallel to a given direction (in this instance perpendicular to the guideways) and will lie in a plane substantially parallel to the surface of the plate 28. Clamping means for fixing the slide-wire structure 31 in its adjusted position are provided by thumb screws 31a adapted to engage the guide rods 29 and 30. Pivoted about an axis 33 perpendicular to the plane of translation of the contact edge 32 of the slide-wire structure, for deflection through a limited angle in said plane, is a contact member consisting of an arm 34 carrying a contact element 35 formed of suitable metallic material and conformed to a straight line which, if produced, would pass through the axis 33. Connection to the outside circuit is provided by binding posts 32a and 35a flexibly connected to the left-hand end of the resistance winding 32 and the contact element 35, respectively.

Elements of the mechanism are disposed in a manner that with the contact arm 34 in its "zero" position, corresponding to the left-hand limit of its angular displacement as seen in the drawing, the contact element 35 will extend in a direction parallel to the guideways 29 and 30, and will engage the slide-wire at the left-hand end of its winding, whatever be the adjusted position of the slide-wire. By a geometrical analysis similar to that given in connection with the form of the invention hereinabove described, it will be seen that the resistance included between the left-hand end of the slide-wire and the point of contact of the contacting element will be proportional to the linear deflection of any point on the swinging contact arm in a direction parallel to the extended length of the contacting surface of the slide-wire. In other words, the resistance value will vary as the cosine of the angle of deflection of the contacting arm from its zero position.

In order that the mechanism may include a member whose linear deflection shall be proportional to that of the contact point, there are provided two guide blocks 36 and 37 mounted on the plate 28, and adapted to form guides wherein may be translated a bar 38 in a direction parallel to the extended length of the slide-wire element. Formed in the extremity of the contact arm 34 remote from the axis 33 is a straight slot 39 radial to said axis and adapted to engage operatively a pin 40 fixed to the bar 38, said pin being extended to form a knob or handle 41, whereby the bar 38 and the pin 40 carried thereby may be manually moved as constrained by the guide blocks 36 and 37. A pointer 42 attached to the knob 41, and indicating on a graduated scale 43, provides a measure of the excursion of the bar 38 along its path; and as it is slidably moved from its left-hand position, as seen in the drawing, the point of contact between the contact element 35 and the slide-wire will be moved in a similar sense, and to an extent directly proportional to the movement of said bar, and with a magnitude depending upon the distance of the slide-wire structure from the axis 33.

In Fig. 7 is shown diagrammatically the application of the invention in principle as set forth in Figs. 1, 2, and 3, to a structure in which a stationary resistance unit is made up of a plurality of discrete sections connected by leads of relatively negligible resistance value to a plurality of contact elements adapted for adjustment as hereinabove set forth, but wherein, it will be obvious, the precision of adjustment will not be so great as in the case of the previously described embodiments. A group of permanently adjusted resistance units 44, 45, 46, etc., are fixedly mounted and connected in series, the terminals of individual units being connected by flexible leads 47, 48, 49, etc., to corresponding contacts 50, 51, 52, etc., disposed along a line upon an arm 53 swingable about an axis 54, and intersecting the same at a point lying within the contact 50, which corresponds to a zero resistance setting of the rheostat, so that the extremity of the contact arm may move in an arc a—b lying in a plane perpendicular to the axis 54. A contact carriage 55 is translatable along a line c—d by means of a structure similar to that set forth in Figs. 1, 2, and 3, and carries a contact element 56 having a contact surface disposed in a straight line perpendicular to the direction of translation, lying in the plane of the arc a—b and intersecting the line of contacts 50, 51, and 52. Binding posts 57 and 58 flexibly connected respectively to the contact 50 and the contact element 56 provide terminals for the rheostat, whose total effective ohmic resistance is the value as measured between these terminals. A handle or knob 59 provides means for manually positioning the contact 56; and a pointer 60 reading upon a graduated scale 61 provides a measure of its translation in a sense perpendicular to the extended length of contact member 56.

By comparison of the arrangement shown in Fig. 7 with that shown in Figs. 1, 2, and 3, it will be obvious that its performance will be in every respect similar, and that, without changing the range of linear excursion of the contact carriage, the equivalent value of resistance representing its travel may be varied according to angular settings of the arm 53, at the same time effecting a proportional change of increments throughout the entire range of the contact element.

It may be observed that for purposes of the invention, the translatable element of the combination need not be translated in a straight line, so long as its parallelism is maintained. Thus, there might be used a form of parallel motion having solely pivoted connections, similar to a draftsman's parallel ruler, in which case the only component of movement of the translatable member entering into the computation is that in a sense perpendicular to its extended length.

I claim:

1. An adjustable resistance device, comprising a plate having separated guides mounted thereon, a rod mounted in the guides for longitudinal movement therein, a contact member fixed to said rod for displacement over the plate parallel to itself and having a contact face conformed to a continuous line parallel to the plane of the plate, and a resistance member supported at one end on said plate and adapted for adjustment angularly about its support parallel to the plate, said resistance member having a plurality of adjacent contact points disposed along a continuous line for engagement by the contact face of said contact member.

2. An adjustable resistance device, comprising a base, an extended resistance member mounted thereon having a plurality of adjacent contact points rigidly disposed along a continuous straight line, a contact member mounted on said base having a contact face conformed to a continuous straight line intersecting said first line for mutual engagement of said face and said points, means carried by the base to guide one of the member for rectilinear movement over the other in the plane determined by said lines, and means for mounting said resistance member on the base to provide for angular movement thereof to a selected position in said plane, together with means for fixing the said resistance member in its selected angular position.

PERRY A. BORDEN.